United States Patent
Fischer

(10) Patent No.: US 6,750,806 B2
(45) Date of Patent: Jun. 15, 2004

(54) METHOD OF TRACKING A TARGET AND TARGET TRACKING SYSTEM

(75) Inventor: Pierre Fischer, Genève (CH)

(73) Assignee: Oerlikon Contraves AG, Zurich (CH)

( * ) Notice: Subject to any disclaimer, the term of this patent is extended or adjusted under 35 U.S.C. 154(b) by 0 days.

(21) Appl. No.: 10/453,215

(22) Filed: Jun. 3, 2003

(65) Prior Publication Data

US 2004/0061641 A1 Apr. 1, 2004

(30) Foreign Application Priority Data

Jun. 12, 2002 (CH) .............................. 1001/02

(51) Int. Cl.$^7$ .............................................. G01S 13/00
(52) U.S. Cl. ........................................ 342/96; 342/95
(58) Field of Search ........................ 342/62, 67, 74, 342/76, 90, 95, 96

(56) References Cited

U.S. PATENT DOCUMENTS

| | | | | |
|---|---|---|---|---|
| 3,699,573 | A | * 10/1972 | Andrews et al. | 342/96 |
| 3,731,304 | A | * 5/1973 | Caspers et al. | 342/90 |
| 4,319,242 | A | * 3/1982 | Lewis | 342/67 |
| 5,144,316 | A | * 9/1992 | Uhlmann et al. | 342/189 |
| 5,311,187 | A | * 5/1994 | Garside | 342/59 |
| 5,379,676 | A | | 1/1995 | Profeta et al. | |
| 5,491,645 | A | * 2/1996 | Kennedy et al. | 701/215 |
| 5,960,097 | A | | 9/1999 | Pfeiffer et al. | |
| 6,018,307 | A | * 1/2000 | Wakayama et al. | 342/26 |
| 6,043,867 | A | | 3/2000 | Saban | |
| 6,064,333 | A | * 5/2000 | Stromberg | 342/81 |
| 6,211,810 | B1 | * 4/2001 | Schirf | 342/36 |
| 6,239,739 | B1 | | 5/2001 | Thomson et al. | |

FOREIGN PATENT DOCUMENTS

| | | |
|---|---|---|
| EP | 0 71 215 | 7/1982 |
| EP | 0 071 215 A | 2/1983 |
| EP | 0 607 015 B1 | 7/1994 |
| EP | 0 977 003 A | 1/2000 |
| EP | 0 97 70 03 | 2/2000 |
| GB | 2 086 685 A | 3/1982 |
| GB | 2 086 685 A | 5/1982 |

* cited by examiner

*Primary Examiner*—Thomas H. Tarcza
*Assistant Examiner*—Brian Andrea
(74) *Attorney, Agent, or Firm*—McCormick, Paulding & Huber LLP

(57) ABSTRACT

A method of tracking a target (2) moving in an airspace and a target tracking system (10) for performing the method are described. A search sensor (12) searches a search space at a first clock rate ($2\pi/\Delta T1$) and establishes target information in regard to a track (4) flown through by the target (2). Calculation means (16) extrapolate an expected flight path (6) from the target information established and provide flight path data, which describes the expected flight path (8), to a tracking sensor (14), which covers a tracking space (15), and provides this data at a second clock rate ($2\pi/\Delta T2$), which is higher than the first clock rate ($2\pi/\Delta T1$). When the target (2) reaches the tracking space (15), the tracking sensor (14) is aimed at the expected flight path (6) on the basis of the flight path data provided, the target (2) is detected as soon as it is detectable by the tracking sensor (14), and the tracking sensor (14) is tracked on the target autonomously.

30 Claims, 2 Drawing Sheets

METHOD OF TRACKING A TARGET AND TARGET TRACKING SYSTEM

CROSS REFERENCE TO PRIOR APPLICATION

Applicant hereby claims foreign priority under 35 U.S.C. § 119 from Swiss Patent Application No. 2002 1001/02 filed 12 Jun. 2002, the disclosure of which is herein incorporated by reference.

BACKGROUND OF THE INVENTION

The present invention relates to a method of tracking a target and a target tracking system.

The present invention is particularly, but not exclusively, implemented in the context of tracking flying targets which are to be combated.

Typically, a search sensor and a tracking sensor are used for this purpose. The search sensor, which covers a search space, is particularly intended for the purpose of searching its search space for a target located therein and determining target information in this way, which describes at least the movement of the target and/or the track of the target in the past. The target information typically includes further data about the target, particularly about the type of target. In general, it is expedient to design the search sensor in such a way that it may be active using a large range and in a wide angular region, i.e., in a broad search space, and may provide detailed target information. Search sensors typically operate using relatively low search clock rates. Extrapolative flight path data is then established from the data determined by the search sensor, which describes the expected movement of the target in the future. This flight path data is essentially used for the purpose of performing a coarse alignment of the tracking sensor. The tracking sensor is frequently designed so that it covers a tracking space which is more restricted than the search space of the search sensor. After taking over the target from the search sensor, the tracking sensor must search for the target again in a starting phase of its activity before it may detect the target, align itself to the target, and track the target.

The main disadvantage of this typical method is that the target is not taken over by the tracking sensor without problems. The problems are particularly severe in this case if the tracking sensor has worse vision properties and/or a significantly smaller field of view and/or a different range than the search sensor. A further disadvantage is that the search clock rate of the sensor, which at least partially determines the method sequence, and which is used to provide the target aircraft data for the tracking sensor, is relatively low, but the search clock rate may not be increased at an acceptable cost.

A method and a system for a fire-control system of a manually aimable weapon are known from U.S. Pat. No. 5,379,676. In this case, a sensor system is provided, having a radar device and an electro-optical recognition system in the form of an FLIR camera. This method and this system are relatively complex in their construction, but the results achieved therewith are still not satisfactory.

SUMMARY OF THE INVENTION

It is therefore the object of the present invention,
to suggest an improved method of the type initially cited; and
to provide a target tracking system for performing this method, using which the disadvantages of the related art are avoided.

The novel method runs as follows: The search sensor searches its search space for a target, as in the typical method. In this case, the search space is searched at a first clock rate and/or search clock rate in multiple search passes. The search clock rate does not have to be precisely constant for this purpose. The search sensor determines an image sequence from each viewing angle, the time interval of the images of an image sequence being determined by the first clock rate and/or search clock rate. Digital images are also to be understood as images in this context. For rotating sensors, the first clock rate and/or search clock rate generally corresponds to the number of search sensor rotations per unit of time. If a target is located in the search space, the search sensor establishes target information at its search clock rate during multiple sequential search passes and/or search sensor rotations. The target information describes, possibly using interpolations, the track which the target has already flown through. The target information may also contain further details about the target, for example, information about the target type or results of a friend/foe query, through which targets detected are classified as objects to be combated, i.e., actual targets, or as friendly aircraft. With knowledge of the target information of multiple search passes, but possibly only using the target information relating to enemy targets, an expected flight path and/or flight path data, which describe the flight path the target is expected to take in the future, are provided through extrapolation. Instead of taking over the target directly, as in the typical method, searching for the target from the beginning once again at this time, and tracking it autonomously, in the novel method, the tracking sensor does not track the sensor autonomously, but externally controlled. The external control is performed on the basis of the flight path data provided to the tracking sensor at a second clock rate, which is higher than the first clock rate and/or search clock rate. During the transition phase, the externally controlled tracking sensor is aimed at the expected flight path, even if the target is in the tracking space, but may not be sensed by the tracking sensor. As soon as the target may be sensed, it is detected by the tracking sensor, through which the transition phase and/or the external control of the tracking sensor is ended. From now on, the tracking sensor is tracked on the target autonomously and/or tracks the target autonomously. During the transition phase, the target may not be directly sensed by the tracking sensor, but the tracking sensor nonetheless tracks the target in a way which may be referred to as "blind", at least approximately in the scope of the possible precision, which is determined by extrapolation, among other things. Searching for the target again, this time by the tracking sensor, is not necessary. In the moment in which it may directly sense the target, the tracking sensor is already aimed at the target. In practice, a target point, which the tracking sensor is aimed at, and the target point surroundings are shown with the aid of a display unit (in the form of a monitor, for example), an arrangement in which the target point occupies the center of the monitor typically being selected. In the novel method, when the target may be sensed directly by the tracking sensor, it appears in direct proximity to the target point (or within a gate which is displayed on the monitor); the target would appear exactly around the target point if the actual flight path was coincident with the extrapolated flight path and no other uncompensated errors were noticeable. For transmission within the system of the data used in connection with the novel method, the target tracking system also has the typical suitable transmission means. In addition, it is also to be noted that the particular data is, of course, also updated continuously or in a clocked way, taking the particular newest target information into consideration.

The advantages achieved using the present invention are essentially as follows: an operator at the tracking sensor must neither perform manual search movements nor initiate automatic search movements as long as no target appears on the monitor of the tracking sensor; reasons that no target appears could be as follows: the target is not yet in the tracking space and/or is too small; the target is in the tracking space, but the view of the target is covered or not recognizable due to atmospheric absorption. At latest when the target reaches the tracking space, the tracking sensor acts, with the aid of the external control, as it would if it was able to detect the target, although it is "target-blind"; the tracking sensor may possibly also be aimed at the target and/or the suspected flight path before the target reaches the tracking space. In any case, the detection of the target is always ensured if the search sensor has found a target. The operator may therefore concentrate on waiting for the end of the transition phase, and thus the appearance of the target on the monitor, in order to subsequently optically/manually or automatically track the tracking sensor on the target. Even after long "blind" target tracking, the target, which may then be sensed directly by the tracking sensor, may be rapidly tracked and possibly rapidly combated, in any case, significantly more rapidly than with the typical use of the flight path data, which was provided only at the low first clock rate and/or search clock rate.

For flawless and efficient performance of the novel method, it is not necessary for the search sensor and the tracking sensor to have identical search characteristics or specific search characteristics tailored to one another. This has the advantage that different sensors, from different weapons systems, for example, are usable together by being coupled into an efficiently acting sensor composite, through which the value of each sensor for combating targets increases. This is especially advantageous because the tracking sensors are frequently components of already existing weapon systems, whose efficiency may be elevated by working together with search sensors.

In particular, the search sensor and the tracking sensor may have unequal ranges and/or cover unequal angular spaces, the search sensor generally having a larger range and usually also able to search a broader angular space.

In certain cases, it may be advantageous to provide a search sensor with search sensor units having multiple different capabilities; the search sensor units may, for example, be responsible for different partial search spaces which nonetheless overlap easily, or they may be responsible for the same search space but with different view and/or detection relationships; these include not only different conditions in the space between sensor and target, but also different properties of the target, which lead to different detection results.

Frequently, a radar sensor is used as a search sensor and an infrared sensor, preferably an FLIR sensor, or a TV camera or an optical line of sight is used as a tracking sensor, for example.

The tracking sensor is preferably implemented so that it is aimable at the target completely independently of the direct detectability of target by the sensor itself, possibly even if the target is not yet in the space which may be sensed by the tracking sensor.

The tracking means of the tracking sensor may be implemented for manual or automatic tracking of the tracking sensor. Tracking sensors which may be tracked both automatically and manually are advantageous, so that a malfunction of the automatic tracking system does not cause the malfunction of the entire tracking sensor.

The novel method is especially suitable in cases in which the tracking sensor is positioned spatially separate from the search sensor, but, of course, in a known relative position to the search sensor. To achieve more precise results, the relative position must be included in the calculations in this case. Frequently, but not necessarily, search sensors are fixed and tracking sensors are mobile. Search sensors may form components of complex fixed early warning systems, while tracking sensors may form components of fire control devices or weapon carriers of weapons systems, which are frequently not fixed.

The search sensor and/or the tracking sensor may be equipped with appropriate search means for establishing the particular relative positions.

Individual calculation units may form the calculation means necessary in connection with performing the method. Such calculation units may be assigned to both the search sensor and the tracking sensor. Generally, both the search sensor and the tracking sensor, and frequently also auxiliary systems such as weapons carriers, have specifically implemented calculation units.

In many cases, the target tracking system has only one search sensor, but more than one tracking sensor. If a further tracking sensor is in a different relative position to the search sensor than the first tracking sensor cited, further flight path data, which takes the different relative position of the further tracking sensor into consideration, is to be provided for the further tracking sensor.

Flight path data or further data essential to the method may be transmitted specifically to an auxiliary system with the aid of communication means. The auxiliary system may, for example, be a weapons carrier, particularly a gun or a rocket launcher. The weapon carrier may also be mobile. Weapon barrels of guns and/or the corresponding servos are frequently controlled with the aid of tracking sensors. In this context, the weapon carriers fire projectiles, also referred to as weapons, which are to hit the target, frequently in fragments. The data must take the relative position of the weapon carrier to the tracking sensor into consideration for this purpose, and a lead calculation must be performed for controlling the weapon barrel, which takes the flight behavior and/or the ballistics of the projectiles into consideration in particular.

In an especially advantageous embodiment, the search sensor may also be implemented so that it may establish target information of not just one, but rather multiple targets. The target information, which relates to different targets, is then analyzed with the aid of the calculation means, which has a specific intelligence for this purpose, and provided for different tracking sensors.

It is typical for the tracking sensors to have filter means, and it is a special advantage of the present invention that such filters may be preset taking the flight path data into consideration.

In practice it is unavoidable that the novel target tracking system is implemented so that time delays caused by the system arise when the novel method is implemented. In order to avoid errors caused by such time delays, it is advantageous to perform the calculations while taking the time delays into consideration, so that a compensation is performed to track the tracking sensor more precisely.

BRIEF DESCRIPTION OF THE DRAWINGS

Further details and advantages of the present invention are described in the following on the basis of an exemplary embodiment and with reference to the drawing.

DESCRIPTION OF THE PREFERRED EMBODIMENTS

Figure 1:
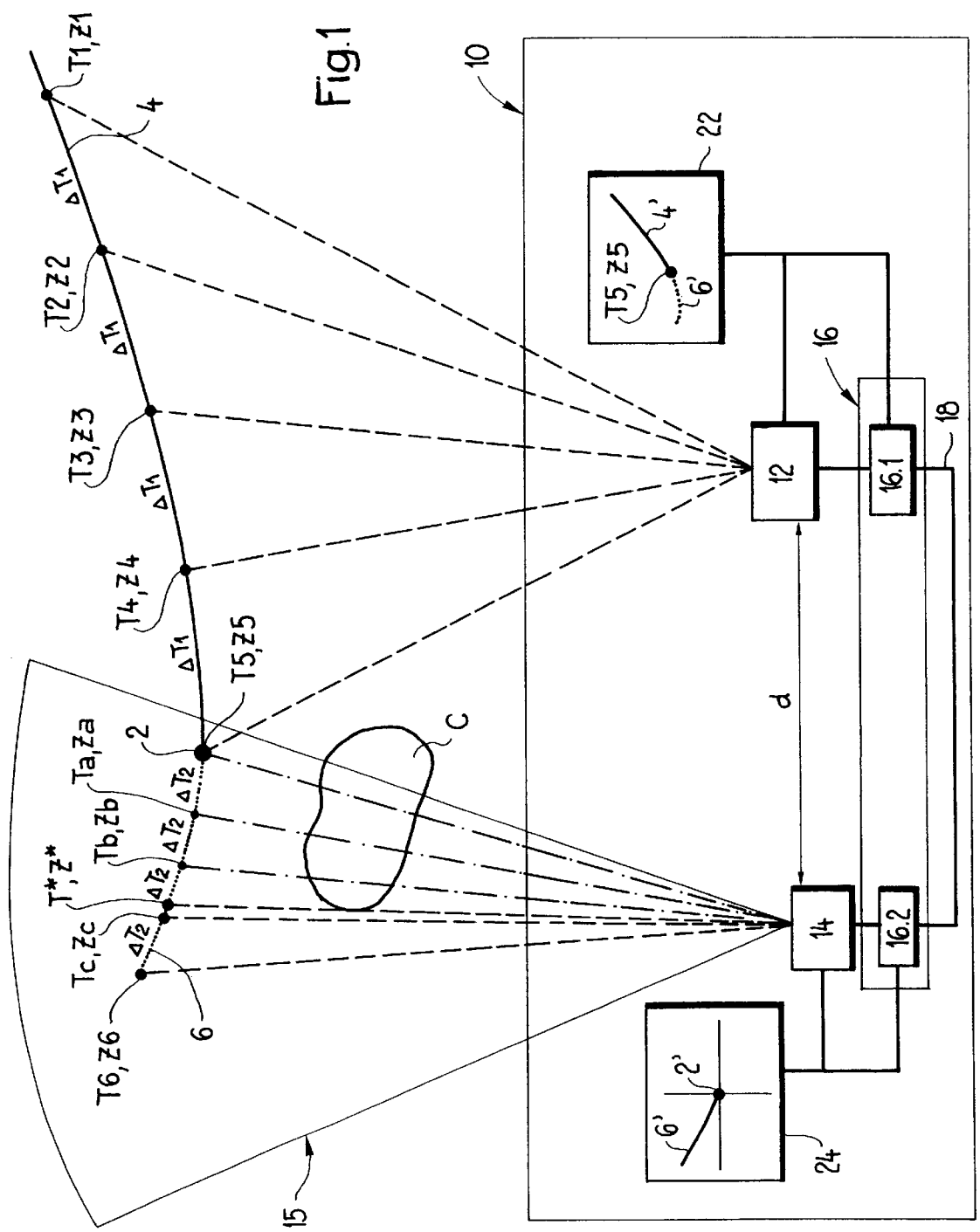
FIG. 1 shows a schematic illustration of a first target tracking system according to the present invention, which also illustrates the execution of the method according to the present invention.

In FIG. 1, a target 2, moving in an airspace, is shown at a time T5 at a location Z5. The target 2 has already flown through a track 4. On the basis of an extrapolation based on the track 4, it is expected that the target 4 will fly further on a flight path 6, shown using a dotted line.

The target 2 is tracked with the aid of a target tracking system 10 according to the present invention. The target tracking system 10 has a search sensor 12, a tracking sensor 14, calculation means 16, and transmission means 18. The search sensor 12 covers a broad search space, whose delimitation is not shown. The tracking sensor 14 covers a tracking space 15.

The search sensor 12, which has a search radar and which rotates in the present case, searches a search space in multiple passes and/or rotations, which follow one another at time intervals $\Delta T1$, which do not have to be constant, and which correspond to a first and/or search clock rate of $2\pi/\Delta T1$, which also does not have to be constant.

The tracking sensor 14 is positioned spatially separate from the search sensor 12, at a distance d. The vectorial distance d of the tracking sensor 14 from the search sensor 12, and therefore also the relative position of the tracking sensor 14 to the search sensor 12, are known. The search sensor 12 is also assigned a visualization unit 22 and the tracking sensor 14 is assigned a visualization unit 24.

The calculation means 16 include a first calculation unit 16.1, which assigned to the search sensor 12, and a second tracking unit 16.2, which is assigned to the tracking sensor 14.

The transmission means 18 are used for transmission of data within the system, in particular between the search sensor 12, the calculation units 16.1, 16.2 of the calculation means 16, and the tracking sensor 14. The transmission means may include transmission units connected by wire and/or wireless transmission units.

It is also to be noted that the dashed lines between the search sensor 12 and the track 4 and between the tracking sensor 14 and the flight path 6 symbolize sensing of the target 2, while the dot-dashed lines between the tracking sensor 14 and the flight path 6 symbolize the particular alignment of the externally controlled tracking sensor 14 in the transition phase.

In an instant T1, the search sensor 12 had located the target 2 at a location Z1. Subsequently, the target 2 was located at Z2 in instant T2, at Z3 in instant T3, and at Z4 in instant T4. In instant T5, the target 2 is located, as already described, at Z5. Target information is and/or was determined by search sensor 12 in each of the instants Z1 to Z5. This target information essentially describes, or more precisely interpolates, the track 4. From the target information established, the calculation means 16 extrapolate the expected flight path 6 and/or provide flight path data which describes this expected flight path 6 in the region between Z5 and Z6.

The extrapolation of the flight path 6 is performed by the calculation means 16, and the corresponding flight path data is transmitted to and/or provided for the tracking sensor 14 with the aid of the transmission means 18.

The extrapolation of the flight path 6 may be performed using the calculation unit 16.1 or using the calculation unit 16.2; if the flight path 6 is extrapolated first by the calculation means 16.2, the data transmitted by the transmission means 18 are transmitted at a clock rate which is equal to the search clock rate $2\pi/\Delta T1$; the transmission means 18 are loaded less in this way than with a transmission of data at a second clock rate $2\pi/\Delta T2$, which is higher than the search clock rate $2\pi/\Delta T1$, at which the flight path data is provided for the tracking sensor 14 according to the present invention.

The higher clock rate corresponds to a time interval $\Delta T2$, which is only a fraction of the time interval $\Delta T1$. In the illustration shown in FIG. 1, the ratio of the time intervals $\Delta T1/\Delta T2$ is four; this ratio of the time intervals and therefore the inverse ratio of the clock rates is only selected to make the drawing clear.

The flight path 6 shows the expected movement of the target after the instant T5. In the time interval between the instant T5 and the instant T6, the target 2 travels, starting from Z5, presumably to Z6, it able to be expected at least approximately at Za and Zb and Zc at the instants Ta, Tb, and Tc, respectively.

The transition phase begins in the instant T5; the target 2 has reached a tracking space 15 which may be covered by the tracking sensor 14, but may not yet be sensed and/or detected by the tracking sensor 14. Therefore, it is impossible for the tracking sensor 14 to be autonomously tracked on target 2 and/or for it to track the target 2 autonomously.

There are numerous reasons that the target tracking sensor 14 may not detect the target 2, although it is undoubtedly in the tracking space 15; for example, the target 2 may be too small or may be covered by an obstruction, illustrated merely for exemplary purposes in FIG. 1 as a cloud C, or the light or atmospheric conditions may not permit the target 2 to be sensed by the tracking sensor 14. The tracking sensor 14 is externally controlled by using the flight path data during the transition phase according to the present invention, it being aimed by its aiming means at the particular location at which the target 2 is expected to be located. In this way, the tracking sensor 14 is capable of tracking the target 2 "blindly" to a certain degree. At the instants Ta and Tb, the tracking sensor is pointed at points Za and Zb, respectively, at which the target 2 is located, although the target 2 is covered by the cloud C and is not visible to the tracking sensor 14. At instant Tc, the target 2 is at point Zc and the cloud C no longer forms an obstruction between the tracking sensor 14 and the target 2. The transition phase, in which the target 2 was externally controlled, is ended as soon as the target 2 has reached the location Z* at time T*. The target 2 may now be detected by the detection means of the tracking sensor 14 and the tracking means track the tracking sensor 14 on the target 2, in other words, the tracking sensor 14 now tracks the target 2 autonomously.

At instant T*, the target 2, or more precisely an image 2' of the target 2, in a target point which is formed by the origin of a coordinate network, appears on the visualization unit 24 of the tracking sensor 14; however, it is assumed in this case that the track actually flown through by the target 2 after the instant T5 corresponds with the extrapolated flight path, and the method runs ideally overall or that possible errors are compensated for. If the tracking of the tracking sensor 14 runs ideally from the instant T* onward, the image 2' of the target 2 always remains in the target point and/or in the origin of the coordinate network. If the tracking sensor 14 was not tracked on the target 2 from instant T* onward, the image 2' of the target 2 would travel along the image 6'0 of the flight path 6, as is also shown in FIG. 1. It would also be possible to overlay imaginary images of the target 2 and/or target marks, which reproduce the actual location Z5 of the target 2 at the instant T5 and the expected locations Za and Zb of the target 2 at the instants Ta and Tb; however, such target marks Y5, Ya, and Yb would not be images 2' and/or imaging of the target 2, but rather a fiction.

The visualization unit 22 of the search sensor 12 shows the track 4 of the past and the expected flight path 6 of the target 2.

Figure 2:
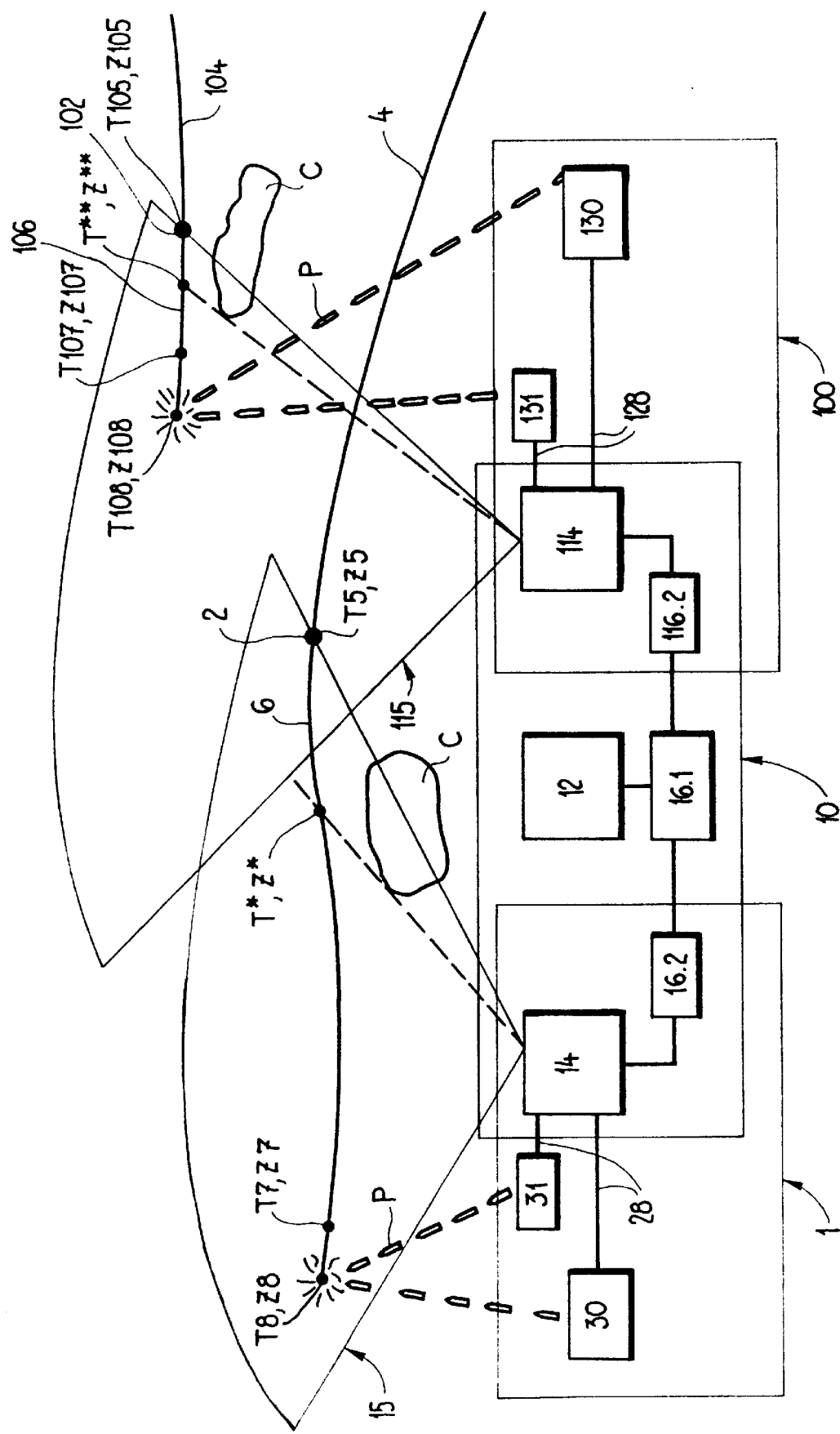
FIG. 2 shows a second target tracking system according to the present invention, to which auxiliary systems are coupled.

FIG. 2 shows a second target tracking system 10 according to the present invention, having a search sensor 12, which is implemented for the purpose of establishing target information not only from the target 2 but also from a second target 102. The targets 2 and 102 are illustrated on their tracks 4 and 104, respectively. The calculation unit 16.1 is implemented for the purpose of assigning the targets 2 and 102 for further tracking, the unit assigning the target 2 to the tracking sensor 14 and the target 102 to a further tracking sensor 114. If there is no second target, the single target 2 may be assigned to both tracking sensors 14, 114. The target tracking system 10 has, in addition to the calculation unit 16.2, a further calculation unit 116.2, which is assigned to the further tracking sensor 114. The tracking sensor 14 has a tracking region 15 and the tracking sensor 114 has a tracking region 115, which partially overlap. Two auxiliary systems 30, 31 are coupled via communication means 28 to the tracking sensor 14, correspondingly, auxiliary systems 130, 131 are coupled to the tracking sensor 114 via communication means 128. The auxiliary systems are generally weapon carriers, whose weapons and/or projectiles P are to combat the targets 2, 102. It may also be said that the tracking sensors 14 and 114, together with their associated auxiliary systems 30, 31 and 130, 131, respectively, form two weapon systems 1 and 100, respectively.

The following part of the description is simplified and a summary, the method and system-specific details of the present invention described in regard to FIG. 1 also applying to FIG. 2.

The target 2 was assigned to the tracking sensor 14 and has reached the tracking space 15 in the instant T5; in the transition phase up to instant T*, the tracking sensor 14 tracks the target 2 in an externally controlled and "blind" way until the target 2 may be sensed by tracking sensor 14 at Z* and is therefore also autonomously trackable. At an instant T7, the target 2 has reached the location Z7 and therefore a space favorable for combating it. At an instant T8, the target 2 will have reached the location Z8. The projectiles P intended for combating the target 2 are fired at instant P7 on the basis of a typical lead calculation, not at the location P7, but rather at the location P8, where the target 2 encounters the projectiles P at instant T8. The flight path 6 therefore ends at Z8.

The second target 102 was assigned to the tracking sensor 114 and has reached the tracking space 115 in the instant T105; in a transition phase up to instant T**, the tracking sensor 114 tracks the second target 102 in an externally controlled and "blind" way until the second target 102 may be sensed by tracking sensor 14 and is therefore also autonomously trackable. The second target 102 is then combated analogously to the target 2, but by the projectiles of the auxiliary systems 130, 131. The flight path 106 ends at Z108.

What is claimed is:

1. A method of tracking a target moving in an airspace, wherein
    a search space is searched with the aid of a search sensor in multiple passes in a first clock rate ($2\pi/\Delta T1$) and target information being established in this way which describes a track flown through by the target,
    an expected flight path is extrapolated with the aid of calculation means from the target information established from at least two passes, and flight path data, which describes the expected flight path, is provided for a tracking sensor, which covers a tracking space,
    the flight path data, which describes the extrapolated expected flight path, is transmitted to the tracking sensor with the aid of transmission means at a second clock rate ($2\pi/\Delta T2$), which is higher than the first clock rate ($2\pi/\Delta T1$), and
when the target reaches the tracking space,
    the tracking sensor is aimed at the expected flight path with the aid of aiming means on the basis of the transmitted flight path data, independently of the detectability of the target,
    the target is detected with the aid of detection means as soon as it is detectable by the tracking sensor, and
    the tracking sensor is tracked on the target autonomously with the aid of tracking means.

2. The method according to claim 1,
wherein the search sensor and the tracking sensor have different search characteristics.

3. The method according to claim 1,
wherein
    the tracking sensor is positioned spatially separated from the search sensor in a known relative position to the search sensor, and
    the calculation of the flight path data is performed while taking the known relative position of the tracking sensor to the search sensor into consideration.

4. The method according to claim 1,
wherein processing of data is performed at least partially by a calculation unit assigned to the search sensor or by a calculation unit of the calculation means assigned to the tracking sensor.

5. The method according to claim 1,
wherein the relative position of the tracking sensor to the search sensor is determined with the aid of search means which are assigned to the search sensor and/or to the tracking sensor.

6. The method according to claim 1,
wherein
    further flight path data for a further tracking sensor is calculated with the aid of the calculation means, and
    the further flight path data is transmitted to the further tracking sensor with the aid of the transmission means.

7. The method according to claim 1,
wherein the flight path data or data based on the flight path data is transmitted to an auxiliary system with the aid of communication means.

8. The method according to claim 1,
wherein
    the search space is searched for a second target with the aid of the search sensor and in this way second target information is established, which describes a second track flown through by the second target, expected flight path data, for use by at least one tracking sensor and at least one auxiliary system, is provided with the aid of the calculation means.

9. The method according to claim 1,
wherein filter means of the tracking sensor are preset while taking the flight path data into consideration.

10. The method according to claim 1,
wherein the flight path data is calculated while taking time delays caused by the system into consideration.

11. A target tracking system for tracking a target moving in an airspace,
having a search sensor, which is designed for the purpose of searching a search space in multiple passes using a first clock rate ($2\pi/\Delta T1$), and
having a tracking sensor, which is designed for the purpose of tracking the target in a tracking space,
wherein the search sensor has:
first detection means, which are implemented for the purpose of detecting target information, which describes a track flown through by the target, during at least some of the passes;
the target tracking system has:
calculation means, which are implemented for the purpose of extrapolating an expected flight path of the target and calculating flight path data which describes the expected flight path from the target information and
transmission means, which are implemented for the purpose of transmitting at least the data containing the target information to the calculation means and at least the flight path data which describes the extrapolated flight path to the tracking sensor, in order to provide the flight path data for the tracking sensor at a second clock rate ($2\pi/\Delta T1$), which is higher than the first clock rate ($2\pi/\Delta T1$); and
the tracking sensor has:
aiming means, which are implemented for the purpose of aiming the tracking sensor at the expected flight path (6) on the basis of the flight path data provided and independently of the detectability of the target,
second detection means, which are implemented for the purpose of detecting the target as soon as it has reach the tracking space and is detectable, and
tracking means, which are implemented for the purpose of tracking the tracking sensor on the detected target autonomously as soon as it is detected by the detection means.

12. The target tracking system according to claim 11,
wherein the search sensor and the tracking sensor have different search characteristics.

13. The target tracking system according to claim 11,
wherein the search sensor has a search characteristic having a greater range than the tracking sensor.

14. The target tracking system according to claim 11
wherein the search sensor has a search characteristic having a search space which is broader than the tracking space of the tracking sensor.

15. The target tracking system according to claim 11,
wherein the search sensor has multiple search units.

16. The target tracking system according to claim 11,
wherein the search sensor has at least one radar sensor.

17. The target tracking system according to claim 11
wherein the detection means of the search sensor are implemented for the purpose of detecting a track of the target in the space from the target information.

18. The target tracking system according to claim 11,
wherein the tracking sensor is an infrared sensor, preferably an FLIR sensor.

19. The target tracking system according to claim 11,
wherein the tracking sensor is implemented in such a way that it may be aimed automatically at the expected flight path by the aiming means, independently of the automatic detection of the target.

20. The target tracking system according to claim 11,
wherein the tracking means for autonomous tracking of the tracking sensor are implemented for manual and/or automatic tracking of the tracking sensor.

21. The target tracking system according to claim 11,
wherein the tracking sensor is not fixed.

22. The target tracking system according to claim 11,
wherein
the tracking sensor is positioned spatially separate from the search sensor and in a known relative position to the search sensor, and
the calculation means are implemented for the purpose of calculating the flight path data while taking the relative position into consideration.

23. The target tracking system according to claim 11,
wherein the search sensor and/or the tracking sensor have search means for establishing the relative position of the tracking sensor to the search sensor.

24. The target tracking system according to claim 11,
wherein at least a part of the calculation means form a calculation unit assigned to the search sensor or to the tracking sensor.

25. The target tracking system according to claim 11,
wherein
the calculation means are implemented for the purpose of calculating further flight path data for at least one further tracking sensor, and
the transmission means are implemented for the purpose of transmitting the further flight path data to the further tracking sensor.

26. The target tracking system according to claim 11,
wherein the tracking sensor includes communication means, which allow transmission of the flight path data to at least one auxiliary system,
the relative position of the at least one auxiliary to the search sensor or the tracking sensor being known, and
the calculation means being implemented for the purpose of calculating flight path data for analysis by the at least one auxiliary system.

27. The target tracking system according to claim 26,
wherein the auxiliary system has at least one, preferably mobile weapon carrier like a gun or a rocket launcher.

28. The target tracking system according to claim 11,
wherein the search sensor is implemented for the purpose of searching its search space for a second target and establishing second target information.

29. The target tracking system according to claim 11,
wherein the tracking sensor has filter means, which may be preset while taking the flight path data into consideration.

30. The target tracking system according to claim 11,
wherein the calculation unit is implemented for the purpose of including time delays caused by the system in the calculation of the flight path data, in order to compensate for the time delays during tracking of the tracking sensor.

* * * * *